(12) United States Patent  
Denniel et al.

(10) Patent No.: US 8,573,888 B2  
(45) Date of Patent: Nov. 5, 2013

(54) METHOD AND APPARATUS FOR MOUNTING DISTRIBUTED BUOYANCY MODULES ON A RIGID PIPELINE

(75) Inventors: Sylvain Denniel, Aberdeen (GB); Richard Alan Leslie Ross, Aberdeen (GB)

(73) Assignee: Technip France SA (FR)

( * ) Notice: Subject to any disclaimer, the term of this patent is extended or adjusted under 35 U.S.C. 154(b) by 430 days.

(21) Appl. No.: 12/306,998

(22) PCT Filed: Jun. 28, 2007

(86) PCT No.: PCT/GB2007/002407  
§ 371 (c)(1), (2), (4) Date: Jan. 12, 2009

(87) PCT Pub. No.: WO2008/001087  
PCT Pub. Date: Jan. 3, 2008

(65) Prior Publication Data  
US 2009/0313794 A1 Dec. 24, 2009

(30) Foreign Application Priority Data

Jun. 30, 2006 (GB) .................................. 0612978.7

(51) Int. Cl.  
*F16L 1/12* (2006.01)

(52) U.S. Cl.  
USPC ........... 405/171; 405/212; 405/211; 405/216; 24/457; 24/27; 441/133

(58) Field of Classification Search  
USPC .......... 405/156, 157, 216, 212, 211; 138/103, 138/140; 441/133; 24/20 R, 284, 282, 457, 24/27  
See application file for complete search history.

(56) References Cited

U.S. PATENT DOCUMENTS 647,693 A * 4/1900 Blantz .............................. 24/27  
738,923 A * 9/1903 Lewis .......................... 43/44.92  
(Continued)

FOREIGN PATENT DOCUMENTS

DE 221801 C 5/1910  
FR 2 711 759 A 5/1995  
(Continued)

OTHER PUBLICATIONS

Search Report dated Oct. 9, 2007 in corresponding GB Application No. 0712655.0.

(Continued)

*Primary Examiner* — Robert J Sandy  
*Assistant Examiner* — Rowland D Do  
(74) *Attorney, Agent, or Firm* — Ostrolenk Faber LLP

(57) ABSTRACT

An apparatus and method for mounting a buoyancy module onto a rigid pipe having a clamp. In one embodiment the clamp includes pads for clamping onto the outer surface or coating of the rigid pip, the pads having a teeth or serrations formed thereon for gripping the outer surface of the pipe. In a second embodiment, the clamp includes one or more coil springs formed from a resilient material adapted to be wound around the outer circumference of the pipe. The method for mounting a buoyancy module onto a rigid pipe includes the steps of reducing the outer diameter of the pipe at a location of the pipe to which a buoyancy module is to be attached and subsequently mounting a buoyancy module at such location.

5 Claims, 2 Drawing Sheets

(56) References Cited

U.S. PATENT DOCUMENTS

| | | | | |
|---|---|---|---|---|
| 862,853 | A * | 8/1907 | Simmons | 43/44.91 |
| 898,784 | A * | 9/1908 | Von Rosenberg, Jr. | 43/44.95 |
| 1,224,063 | A * | 4/1917 | Boor | 24/27 |
| 1,618,160 | A * | 2/1927 | Aldrich | 24/115 A |
| 2,501,634 | A * | 3/1950 | Rector | 43/44.89 |
| 2,562,677 | A * | 7/1951 | Nolan | 24/27 |
| 3,119,415 | A * | 1/1964 | Galloway et al. | 138/103 |
| 3,514,891 | A * | 6/1970 | Krull | 43/44.87 |
| 3,768,842 | A | 10/1973 | Ahlstone | |
| 3,772,718 | A * | 11/1973 | Williams | 441/133 |
| 3,835,890 | A * | 9/1974 | Miceli | 138/103 |
| 3,879,780 | A * | 4/1975 | Williams | 441/133 |
| 3,957,112 | A | 5/1976 | Knibbe et al. | |
| 4,001,918 | A * | 1/1977 | Moore | 24/16 R |
| 4,098,333 | A * | 7/1978 | Wells et al. | 166/352 |
| 4,361,977 | A * | 12/1982 | Lawler | 43/44.83 |
| 4,386,919 | A | 6/1983 | Kadono | 441/133 |
| 4,463,779 | A * | 8/1984 | Wink et al. | 138/125 |
| 4,870,777 | A * | 10/1989 | Morita | 43/42.74 |
| 5,043,033 | A * | 8/1991 | Fyfe | 156/71 |
| 5,195,563 | A | 3/1993 | Brooks | |
| 5,330,294 | A * | 7/1994 | Guesnon | 405/224.2 |
| 5,582,447 | A | 12/1996 | Leon et al. | |
| 5,608,985 | A * | 3/1997 | Kainec | 43/43.1 |
| 5,894,866 | A * | 4/1999 | Horst et al. | 138/172 |
| 5,921,013 | A * | 7/1999 | Kaczynski, Sr. | 43/4.5 |
| 6,134,766 | A * | 10/2000 | Sievert | 29/423 |
| 6,425,200 | B1 * | 7/2002 | Bennis | 43/44.91 |
| 6,524,152 | B1 | 2/2003 | Dauphin et al. | |
| 6,557,589 | B2 * | 5/2003 | Bozic et al. | 138/106 |
| 6,588,807 | B1 | 7/2003 | Burke et al. | |
| 6,878,873 | B2 * | 4/2005 | Fryberger et al. | 174/481 |
| 7,096,940 | B2 * | 8/2006 | Baxter et al. | 166/241.6 |
| 7,300,228 | B2 * | 11/2007 | Colbert | 405/216 |
| 7,749,035 | B2 * | 7/2010 | Oram et al. | 441/133 |
| 2004/0086339 | A1 * | 5/2004 | Tyrer et al. | 405/156 |
| 2005/0005405 | A1 * | 1/2005 | Nagano | 24/20 R |
| 2006/0170215 | A1 * | 8/2006 | Cousineau | 285/420 |

FOREIGN PATENT DOCUMENTS

| | | |
|---|---|---|
| GB | 1277364 A | 6/1972 |
| GB | 2 286 649 | 8/1995 |
| GB | 2288205 A | 10/1995 |
| WO | WO 2004/090348 | * 10/2004 |

OTHER PUBLICATIONS

International Search Report dated Mar. 4, 2008, issued in corresponding international application No. PCT/GB2007/002407.

* cited by examiner

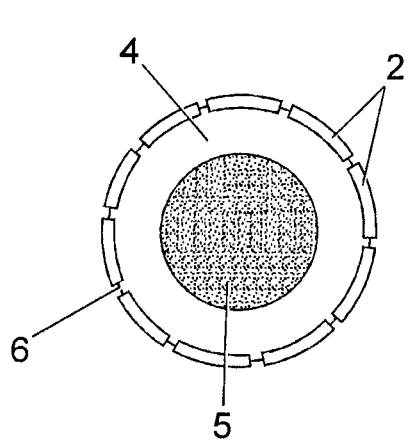
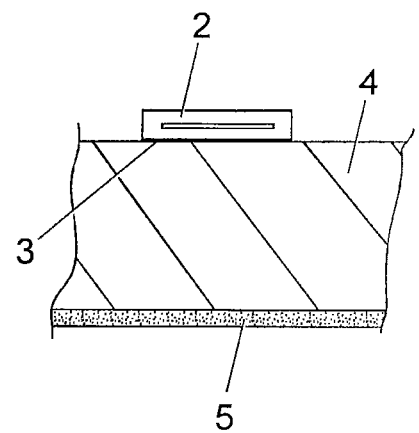
Fig. 1a        Fig. 1b
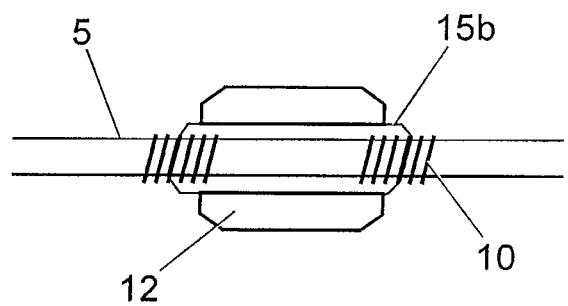
Fig. 2a
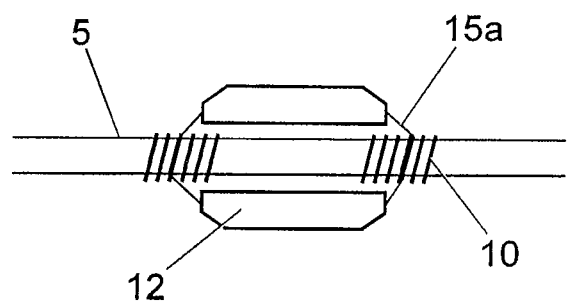
Fig. 2b

METHOD AND APPARATUS FOR MOUNTING DISTRIBUTED BUOYANCY MODULES ON A RIGID PIPELINE

CROSS-REFERENCE TO RELATED APPLICATIONS

The present application is a 35 U.S.C. §371 National Phase conversion of PCT/GB2007/002407, filed 28 Jun. 2007, which claims benefit of Great Britain Application No. 0612978.7, filed 30 Jun. 2006, the disclosure of which is incorporated herein by reference. The PCT International Application was published in the English language.

BACKGROUND OF THE INVENTION

The present invention relates to a method and apparatus for mounting buoyancy modules on a rigid pipeline for conveying oil and gas and especially in subsea applications (offshore pipelines).

SUMMARY OF THE INVENTION

Subsea pipelines are most often used to transport production fluids from offshore facilities to land or to other offshore facilities. Such fluids include, but are not limited to, gases (methane, ethane, etc.), liquid hydrocarbons, additives (diluents added to heavy fluids, or corrosion control additives), or any mixture thereof. These pipelines typically rest on the ocean bottom and can extend for kilometres at depths exceeding 1000 m of water. Many issues arise with respect to the laying of subsea pipelines including countering subsea currents, traversing the varying topography of the seabed, and the complexity of the installation (pipelaying) process itself.

Subsea pipelines are crucial to the low cost delivery of production fluids (hydrocarbons) from offshore facilities to land or to other offshore facilities. If pipelines are not available, the hydrocarbons must be transported via tankers or some other means to the coast. Pipelines are generally considered lower risk than tankers because there is significantly less risk of maritime collisions and there are fewer exchanges (platform to tanker; tanker to shore facility) of the hydrocarbons. However, the varying topography of the seabed and the stresses applied to the pipelines during installation from a pipelaying vessel increase the risk (through stresses and failures) that leaks may occur.

It is known to elevate a subsea pipeline section using distributed buoyancy modules to facilitate the traversal of steep underwater slopes, hazardous topographic features, and other varied irregularities on the seabed and to avoid excessive bending moments during pipeline installation. Distributed buoyancy modules (DBM) are frequently affixed to flexible or umbilical pipelines to vary the buoyancy of such pipelines in the water. Their domain of application has lately been extended to rigid pipelines for applications such as controlled lateral buckle initiation or for riser configuration in the same way as DBM are used on flexible pipelines.

Typical buoyancy modules comprise two half shells of buoyant material mounted onto a clamp which can be secured to the outer surface of a flexible pipe. The clamp creates a friction based interface between the buoyancy module and the pipe. Due to variation in the outer diameter of the pipe due to internal and external pressure, the clamp must be flexible enough to maintain a sufficiently high clamping force against the pipe to resist slippage due to current loading. Such known clamps are typically formed from reinforced plastics or resin which provide flexibility but can also be fragile and prone to breakage and/or creep. Hence the design of these elements can be very sensitive, especially for large diameter pipes.

An object of the present invention is to provide a method and apparatus of mounting a buoyancy module onto a rigid pipeline, particularly a rigid pipeline having a thick coating thereon and more particularly on rigid pipelines installed from a vessel using reeling techniques.

According to one aspect of the present invention there is provided an apparatus for mounting a buoyancy module onto a rigid pipe comprising a clamp means for clamping onto the outer surface or coating of the rigid pipe, said clamp means having an inner surface having a plurality of teeth or serrations formed thereon for gripping the outer surface of the pipe. Preferably said plurality of teeth or serrations are formed on a plurality of pads provided on the inner surface of the clamp means. Preferably said pads are formed from a metal, such as steel or aluminium. Said clamp means may include a clamping band adapted to urge said plurality of teeth or serrations into contact with the outer surface of the pipe. Thus a greater slippage resistance can be provided for a given clamping force than with known buoyancy module clamp means. Said pads may be mounted on the clamping band, preferably at evenly circumferentially spaced locations. The clamping band preferably passes through a slot in each pad to locate and retain each pad on the clamping band.

In order to compensate for the potential reduction in pipe outer diameter under deepwater pressure, a high initial clamping force may be specified to ensure a sufficient clamping force. Alternatively, or additionally, a substantially rigid coating may be applied to the pipe surface in the location where the buoyancy module is to be attached, said coating resisting said increased external pressure and preventing or reducing said reduction in diameter in the region of the clamp.

According to a second aspect of the present invention there is provided an apparatus for mounting a buoyancy module onto a rigid pipe comprising a clamp means for clamping onto the outer surface or coating of the rigid pipe, said clamp means comprising one or more coil springs formed from a resilient material adapted to be wound around the outer circumference of the pipe. Such clamp means may be applied to the pipe and a corrosion resistant or insulating coating may subsequently be applied to the pipe, over the clamp means. Such coil spring clamp means may be provided with one or more fastening elements to which the buoyancy module may be secured once the clamp means has been attached to the pipe. Such fastening elements may comprise chains or linkage means or may comprise simple protrusions to which the buoyancy module may be attached, for example by welding. Another possibility is to provide a simple interference fit between the inner surface of the buoyancy module and the outer surfaces of the clamp means. Such may be suitable for pipes having thinner coatings.

According to another aspect of the present invention there is provided a method for mounting a buoyancy module onto a rigid pipe comprising the steps of reducing the outer diameter of the pipe at a location of the pipe to which a buoyancy module is to be attached, for example by removing some of the pipe coating or initially applying less coating at such location; and subsequently mounting a buoyancy module at such location, the inner diameter of the buoyancy module substantially corresponding to such reduced pipe diameter whereby the greater pipe diameter either side of the buoyancy module resists axial displacement of the buoyancy module along the pipe.

The pipe coating may be machined down at such location to a predetermined profile. A cover portion may be applied to at such location to return the outer diameter of the pipe coating at such location to its original size to maintain a constant coating outer diameter during reeling and when going through tensioners on a pipe laying vessel. Such cover may then be removed to permit mounting of a buoyancy module at such location when desired.

It may be desirable to provide an initially thicker pipe coating at regions of the pipe to which buoyancy modules are to be attached such that the subsequent removal of pipe coating at the desired mounting locations does not impact upon the thermal performance of the pipe, particularly in the case of long riser sections.

In one embodiment, the removal of pipe coating to provide a reduced diameter region for mounting a buoyancy module may take place beyond the tensioner exit of a pipelaying vessel. Such may be particularly practical if local thinning of a region of small width is envisaged.

In order to alleviate the effects of pipe outer diameter reduction due to water pressure at depth, a coating or lesser compressibility may be applied at the regions of the pipe at which buoyancy modules are to be mounted. Alternatively, a compressible layer may be provided on the innermost surface if the buoyancy module which can be compressed during mounting of the buoyancy module onto the pipe onboard the pipelaying vessel and subsequently relax to compensate for the reduction in outer diameter of the pipe coating when at depth. Such compressible layer may be formed from rubber.

A further alternative would be to provide an intermediate buoyancy module mounting member for location at a region of reduced pipe outer diameter, whose inner diameter would still be less than the minimum pipe coating outer diameter.

According to a yet further aspect of the present invention there is provided a method for mounting a buoyancy module onto a rigid pipe comprising the steps of increasing the outer diameter of the pipe in regions of the pipe adjacent and either side of a location to which a buoyancy module is to be attached, for example by applying an additional or further coating to the outer surface of the pipe in such regions; mounting a buoyancy module to such location, the inner diameter of the buoyancy module substantially corresponding to the outer diameter of the pipe at such location, whereby the regions of increased pipe diameter either side of the buoyancy module resist axial displacement of the buoyancy module along the pipe. Preferably the interface between the increased diameter regions and the remainder of the pipe is tapered to avoid reeling problems.

Embodiments of the present invention will now be described with reference to the accompanying drawings, in which:—

BRIEF DESCRIPTION OF THE DRAWINGS

FIGS. 1a and 1b comprise sectional views of a first embodiment of the present invention;

FIGS. 2a and 2b comprise views of a second embodiment of the present invention;

DETAILED DESCRIPTION OF EMBODIMENTS OF THE INVENTION

Figure 3:
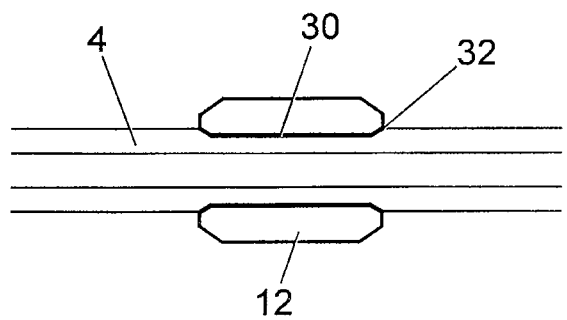
FIG. 3 comprises a view of a third embodiment of the present invention.

Distributed buoyancy modules (DBM) are frequently used on flexible or umbilical lines. Their domain of application has lately been extended to rigid pipelines for applications such as controlled lateral buckle initiator or for riser configuration similar to the one used for flexible pipes (e.g. lazy wave).

Typical DBM designs include two buoyancy half shells mounted onto a clamp mounted onto the flexible pipe. The purpose of the clamp is to create a friction based interface between the buoyancy element and the pipe. Due to non negligible variation of OD of the pipe, the clamp needs to be flexible enough to maintain a sufficiently high pressure against the pipe to achieve a slippage resistance larger than potential slamming of current loading. Known clamps are typically made of reinforced plastics or resin which provide flexibility but can also be fragile and prone to creep. Hence the design of these elements can be very sensitive, especially for large OD pipes.

It is proposed to provide alternative designs for attachment of the buoyancies to rigid pipelines, especially to rigid pipelines provided with thick coatings and potentially installed using the reeling technique.

Biting Clamp Interface

A buoyancy module mounting apparatus according to a first embodiment of the present invention is illustrated in FIGS. 1a and 1b.

For most flexible lines or umbilical lines, biting into the external sheath may not be acceptable and may be un-productive as the potential line of slippage could be at the sheath/armouring interface. On the other hand, this may be conceivable to be able to bite into the coating of a rigid pipe to provide high slippage resistance of the clamp. This could be all the more acceptable if the wall thickness of the coating, where the clamp shall be installed is slightly increased accordingly.

The clamp comprises of a number of small stainless steel or aluminium pads 2, each pad having serrations or teeth 3 on its internal face in order to bite into the coating 4 on the pipeline 5. The initial pressure of tightening can be applied through a tightening band 6, such as used in standard DBM (e.g. roblon band). This required pressure may be less than for standard clamps as the slippage resistance is greater. However, it would be conceivable to actually apply larger tightening loads without concerns for the clamp integrity, which is not prone to creeping.

The main concern of the system would be potential reduction of the pipeline coating OD reduction under deepwater pressure (up to 10% of the coating wt, i.e. 2-5% pipe OD). In order to ensure a sufficiently high pressure of contact to maintain the biting effect one may consider an initially higher tightening pressure. An alternative could also be to ensure that the pipeline is coated with a creep resistant (solid) coating at the know location of application of the DBM.

Interface with Steel Pipe

A second embodiment of the present invention is illustrated in FIGS. 2a and 2b. Rather than considering a clamping on the coating external wall, the second embodiment of the invention provides anti-slippage fixations located at the pipeline external surface, below the insulation coating. In one version, such interface comprises a spring or coil 10 tightly wound around the pipeline 5, the spring being coated with a corrosion resistant material. The prime merit of using a spring is that its does not impact on the bending stiffness of the steel pipe and does not interfere with the reelability of the line. The rod diameter of such a spring would preferably be less than of the insulation coating of the pipeline, so that there is no risk of interference with the pipelay equipment.

Following the application of the spring 10 onto the pipeline, application of the remaining layers of the corrosion coating may be applied. Optionally, a dedicated coating design may be taken into consideration along the pipe section planned to be mounted with DBM.

A connection means is attached to the spring 10, prior to the coating operation. This could for example comprise chains 15b or protruding small metal sheets 15a to which the buoyancy module 12 can be welded or otherwise attached. The former could allow a mechanical connection of the buoyancy element to the pipe, with a certain flexibility to the location of the DBM, and could allow a welded connection at a fixed location. Another possibility could be an interference fit between a piece of spring and the buoyancy element for thinner coatings. The limitations of such option may be added anodes for protection.

Variable Coating Thickness

An interference fit with the pipeline coating could be another means of providing the buoyancy module with resistance against slippage. This can be ensured by either local thinning of the coating at the DBM location or by local increase of the coating thickness on either sides of a DBM.

FIG. 3 shows a possible design option. Typically, the recess 30 in the pipeline coating 4 would incorporate a smooth taper 32 which would improve reeling friendliness of the coated pipe.

Local thinning of the coating may be overall easier to achieve in terms of manufacturing and pipelay. Indeed, it is possible to machine down the coating with a given profile and to provide a coating cover at the location of the recess to maintain a constant coating OD during reeling and when going through the tensionners. This cover could be eventually removed before application of the DBM.

In the case of DBM positioned along a long riser section it may be considered preferable to consider a thicker overall coating along this pipeline section in order to ensure that the coating localiser thinning do not impact on the thermal performance of the line.

It may be considered to explore cutting or 'grinding off' the necessary thickness of coating past the tensionner exit, provided that the necessary tooling can be developed and that such an operation can be shorter in time than a typical clamp application cycle time. This could be especially of interest if small width, local thinning are considered.

As previously mentioned, coatings can experience up to 10% of reduction of their thickness when exposed to a pressurised and wet environment. In order to address this issue, it may be possible to consider the local adoption of a less compressible coating over the selected pipeline section. Another possible option could be to incorporate a compressible layer (such as rubber) at the base of the buoyancy, which would be compressed during at the moment of application onboard the vessel but may relax under reduction of the pipeline coating.

Figure 4A:
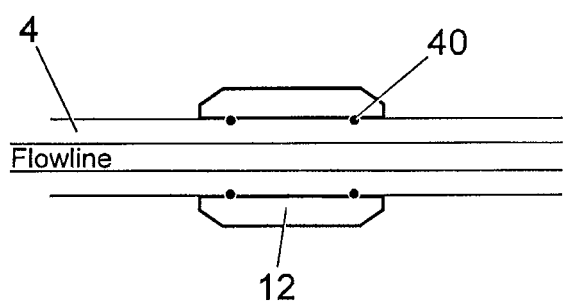
FIGS. 4a and 4b comprise views of a further embodiment of the present invention.
Figure 4B:
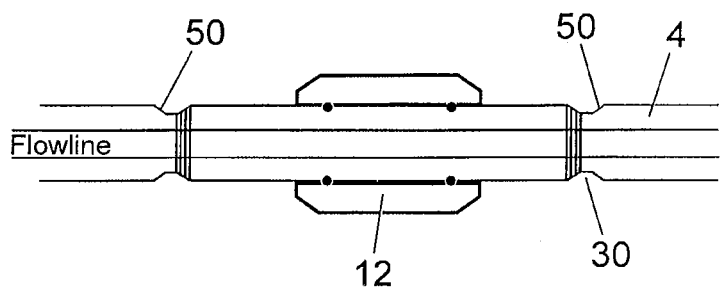

A final possibility could be an intermediate piece, whose ID would still be less than the minimum coating OD reduction possible, see FIGS. 4a and 4b for some examples of holding elements. FIG. 4a illustrates band like holding elements 40 while FIG. 4b illustrates spring like holding elements 50, each being located in a recess 30 in the coating 4 of the pipeline. The design of these intermediate pieces will not need to be especially onerous in terms of material strength or tightening design.

Various modifications and variations to the described embodiments of the inventions will be apparent to those skilled in the art without departing from the scope of the invention as defined in the appended claims. Although the invention has been described in connection with specific preferred embodiments, it should be understood that the invention as claimed should not be unduly limited to such specific embodiments.

What is claimed is:

1. A buoyancy module and an apparatus for mounting the buoyancy module onto a rigid pipe configured to transport liquid or gas hydrocarbons, the apparatus comprising:
   one or more coils together defining a plurality of turns, each turn of the plurality of turns surrounding the rigid pipe, the one or more coils being configured such that the turns of the one or more coils contact and clamp onto an outer surface or coating of the rigid pipe so as to resist slippage of the one or more coils over the rigid pipe; and
   each coil formed from a resilient material and configured to be wound around an outer circumference of the rigid pipe such that each turn clamps onto the rigid pipe; and
   the buoyancy module is secured to the apparatus and positioned over the rigid pipe, the buoyancy module configured to provide a buoyant force to the rigid pipe.

2. The buoyancy module and the apparatus as claimed in claim 1, further comprising a corrosion resistant or insulating coating applied to the rigid pipe over said one or more coils.

3. The buoyancy module and the apparatus as claimed in claim 1, wherein said each coil includes one or more fastening elements configured to secure the buoyancy module and positioned over the one or more coils.

4. The buoyancy module and the apparatus as claimed in claim 3, wherein said one or more fastening elements comprise chains, or linkages, or protrusions are configured to be attached to the buoyancy module.

5. The buoyancy module and the apparatus as claimed in claim 3, wherein each coil has an outer surface, and dimensions of an inner surface of the buoyancy module and the outer surfaces of the coil are configured to provide an interference fit therebetween.

\* \* \* \* \*

UNITED STATES PATENT AND TRADEMARK OFFICE
CERTIFICATE OF CORRECTION

PATENT NO. : 8,573,888 B2  Page 1 of 1
APPLICATION NO. : 12/306998
DATED : November 5, 2013
INVENTOR(S) : Denniel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 472 days.

Signed and Sealed this
Twenty-second Day of September, 2015

Michelle K. Lee
*Director of the United States Patent and Trademark Office*